United States Patent
Chen

(10) Patent No.: US 10,986,643 B2
(45) Date of Patent: Apr. 20, 2021

(54) SYSTEM AND METHOD FOR FLEXIBLE RESOURCE CONFIGURATION OF REFERENCE SIGNALS

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/847,407

(22) Filed: Apr. 13, 2020

(65) Prior Publication Data

US 2020/0245337 A1 Jul. 30, 2020

Related U.S. Application Data

(63) Continuation of application No. PCT/CN2017/106218, filed on Oct. 14, 2017.

(51) Int. Cl.
 *H04W 72/04* (2009.01)
 *H04L 1/00* (2006.01)
 *H04L 5/00* (2006.01)

(52) U.S. Cl.
 CPC ....... *H04W 72/0493* (2013.01); *H04L 1/0013* (2013.01); *H04L 5/0051* (2013.01);
 (Continued)

(58) Field of Classification Search
 CPC ... H04L 1/0013; H04L 5/0051; H04L 5/0094; H04W 72/042; H04W 72/0446; H04W 72/0493
 See application file for complete search history.

(56) References Cited

U.S. PATENT DOCUMENTS

| 2010/0067410 A1* | 3/2010 | He | H04L 5/0048 370/280 |
| 2015/0229453 A1* | 8/2015 | Dai | H04W 72/0453 370/329 |

(Continued)

FOREIGN PATENT DOCUMENTS

| CN | 101714897 A | 5/2010 |
| CN | 101969694 A | 2/2011 |

(Continued)

OTHER PUBLICATIONS

International Patent Application No. PCT/CN2019/104054, "International Search Report", dated Apr. 7, 2020, 2 pages.

(Continued)

*Primary Examiner* — Chi H Pham
*Assistant Examiner* — Weibin Huang
(74) *Attorney, Agent, or Firm* — Perkins Coie LLP

(57) ABSTRACT

A wireless communications method and device is provided. The method includes receiving, by a terminal, time domain resource configuration information of a reference signal resource, determining a period of the reference signal resource and a time domain resource offset of the reference signal resource according to the received time domain resource configuration information, determining at least one target first time domain resource unit according to the period and the time domain resource offset, determining at least one target second time domain resource unit from the at least one target first time domain resource unit, where the at least one target first time domain resource unit includes at least one target second time domain resource unit, and receiving a reference signal or rate matching on a reference signal resource in the at least one target second time domain resource unit.

14 Claims, 5 Drawing Sheets

(52) U.S. Cl.
CPC ......... *H04L 5/0094* (2013.01); *H04W 72/042* (2013.01); *H04W 72/0446* (2013.01)

(56) References Cited

U.S. PATENT DOCUMENTS

| | | | | |
|---|---|---|---|---|
| 2018/0131430 A1* | 5/2018 | Gao | .................... | H04W 72/042 |
| 2018/0139764 A1* | 5/2018 | Hwang | ................ | H04L 1/1671 |
| 2018/0279145 A1* | 9/2018 | Jung | ................ | H04W 36/0083 |
| 2018/0323849 A1* | 11/2018 | Park | ...................... | H04L 5/1469 |
| 2019/0260544 A1* | 8/2019 | Dou | ................ | H04W 72/0453 |

FOREIGN PATENT DOCUMENTS

| | | |
|---|---|---|
| EP | 2663152 A1 | 11/2013 |
| EP | 2840825 A1 | 2/2015 |

OTHER PUBLICATIONS

Huawei et al., "UL SRS design for beam management and CSI acquisition", 3GPP TSG RAN WG1 Meeting #90bis, R1-1717307, Oct. 9-13, 2017, 13 pages.
Guangdong OPPO Mobile Telecom, "On SRS design for NR", 3GPP TSG RAN WG1 NR Ad-Hoc#2, R1-1710147, Jun. 27-30, 2017, 5pages.
Huawei et al., "UL SRS design for beam management and CSI acquisition", 3GPP TSG RAN WG1 NR Ad Hoc Meeting, R1-1709936, Jun. 27-30, 2017, 8 pages.
LTE, Technical Specification Group Radio Access Network; Evolved Universal Terrestrial Radio Access (E-UTRA); Physical Channels and Modulation (Release 8), 3GPP TS 36.211 V8.8.0, issued on Sep. 2009, 82 pages.
Ericsson et al., "WF on SRS for NR issued on Oct. 13", 3GPP TSG RAN WG1 Meeting #90b, R1-1718968, Oct. 9-13, 2017, Prague, CZ, 15 pages.
European patent application No. 17928554.9, European Search Report, dated Aug. 17, 2020.

\* cited by examiner

SYSTEM AND METHOD FOR FLEXIBLE RESOURCE CONFIGURATION OF REFERENCE SIGNALS

CROSS-REFERENCES TO RELATED APPLICATIONS

This application is a continuation of and claims priority to International Patent Application PCT/CN2017/106218, filed on Oct. 14, 2017, the contents of which is hereby incorporated by reference in its entirety.

BACKGROUND OF THE INVENTION

Technical Field

This application relates to the communications field, and more specifically, to a wireless communications method, a terminal, and a network device.

Related Art

In a Long Term Evolution (Long Term Evolution, LTE) system, a terminal device may be configured to transmit a reference signal (for example, a sounding reference signal (Sounding Reference Signal, reference signal), and a channel state information reference signal (Channel State Information Reference Signal, CSI-RS)).

In a new radio (New Radio, NR) system, resource configuration needs to be highly flexible.

Therefore, how to improve the flexibility in resource configuration of a reference signal in an NR system is a problem that urgently needs to be resolved.

SUMMARY OF THE INVENTION

Embodiments of this application provide a wireless communications method and device, to improve the flexibility in resource configuration of a reference signal.

A first aspect provides a wireless communications method, including receiving, by a terminal, time domain resource configuration information of a reference signal resource; determining, by the terminal, a period of the reference signal resource and a time domain resource offset of the reference signal resource according to the received time domain resource configuration information; determining, by the terminal, at least one target first time domain resource unit according to the period and the time domain resource offset; determining, by the terminal, at least one target second time domain resource unit from the at least one target first time domain resource unit, where the at least one target first time domain resource unit includes at least one target second time domain resource unit; and sending or receiving, by the terminal, a reference signal on a reference signal resource in the at least one target second time domain resource unit or performing, by the terminal, puncturing processing or rate matching on a reference signal resource in the at least one target second time domain resource unit.

Therefore, in this embodiment of this application, a terminal determines a period of a reference signal resource and a time domain resource offset of the reference signal resource according to received time domain resource configuration information, the terminal determines at least one target first time domain resource unit according to the period and the time domain resource offset, the terminal determines at least one target second time domain resource unit from the at least one target first time domain resource unit, and the terminal sends or receives a reference signal on a reference signal resource in the at least one target second time domain resource unit or performs puncturing processing or rate matching on a reference signal resource in the at least one target second time domain resource unit. Therefore, the flexibility in resource configuration of a reference signal is improved.

With reference to the first aspect, in a possible implementation of the first aspect, the determining, by the terminal, a period of the reference signal resource and a time domain resource offset of the reference signal resource according to the received time domain resource configuration information includes determining, by the terminal, the period and the time domain resource offset according to the received time domain resource configuration information and a first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

With reference to the first aspect or any possible implementation in the foregoing, in another possible implementation of the first aspect, the determining, by the terminal, the period and the time domain resource offset according to the received time domain resource configuration information and a first subcarrier spacing includes determining, by the terminal, a used mapping relationship table from at least one mapping relationship table according to the first subcarrier spacing, where the mapping relationship table is used to indicate a correspondence between at least one piece of time domain resource configuration information and at least one period and at least one time domain resource offset; and determining, by the terminal, the used period and the time domain resource offset from the determined mapping relationship table according to the received time domain resource configuration information.

With reference to the first aspect or any possible implementation in the foregoing, in another possible implementation of the first aspect, the determining, by the terminal, the at least one target first time domain resource unit according to the period and the time domain resource offset includes determining, by the terminal, the at least one target first time domain resource unit according to the period, the time domain resource offset, and the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

With reference to the first aspect or any possible implementation in the foregoing, in another possible implementation of the first aspect, the determining, by the terminal, the at least one target first time domain resource unit according to the period, the time domain resource offset, and the first subcarrier spacing includes determining, by the terminal, a quantity N of target first time domain resource units included in a single period according to the period and the first subcarrier spacing; and determining the at least one target first time domain resource unit according to N and the time domain resource offset.

With reference to the first aspect or any possible implementation in the foregoing, in another possible implementation of the first aspect, the determining, by the terminal, the at least one target first time domain resource unit according to the period, the time domain resource offset, and the first subcarrier spacing includes determining, by the terminal, the time domain resource offset corresponding to the first subcarrier spacing according to the time domain resource offset and the first subcarrier spacing; and determining, by the terminal, the target first time domain resource unit according to the time domain resource offset corresponding to the first subcarrier spacing and the period.

With reference to the first aspect or any possible implementation in the foregoing, in another possible implementation of the first aspect, the determining, by the terminal, at least one target first time domain resource unit according to the period and the time domain resource offset includes determining, by the terminal, the target first time domain resource unit by using a target first time domain resource unit represented by the time domain resource offset as the first target first time domain resource unit in which the reference signal resource is located and by using the period.

With reference to the first aspect or any possible implementation in the foregoing, in another possible implementation of the first aspect, the determining, by the terminal, at least one target first time domain resource unit according to the period and the time domain resource offset includes determining, by the terminal, an initial target first time domain resource unit according to the period and the time domain resource offset; and when the initial target first time domain resource unit does include a resource used to transmit a reference signal, determining, by the terminal, the at least one target first time domain resource unit different from the initial target first time domain resource unit.

With reference to the first aspect or any possible implementation in the foregoing, in another possible implementation of the first aspect, the determining, by the terminal, the at least one target first time domain resource unit different from the initial target first time domain resource unit includes determining the at least one target first time domain resource unit from another period different from a current period, or determining, as the target first time domain resource unit, a target first time domain resource unit that is closest to the initial target first time domain resource unit and includes a resource used to transmit a reference signal, or determining, as the target first time domain resource unit, a target first time domain resource unit that is closest after the initial target first time domain resource unit and includes a resource used to transmit a reference signal.

With reference to the first aspect or any possible implementation in the foregoing, in another possible implementation of the first aspect, the determining, by the terminal, at least one target second time domain resource unit from the at least one target first time domain resource unit includes determining, by the terminal, a quantity of target second time domain resource units included in the at least one target first time domain resource unit according to the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource; and determining the target second time domain resource unit according to the quantity.

With reference to the first aspect or any possible implementation in the foregoing, in another possible implementation of the first aspect, the determining, by the terminal, a quantity of target second time domain resource units included in the at least one target first time domain resource unit according to the first subcarrier spacing includes, when the first subcarrier spacing is N kHz, determining a value obtained by dividing N by 15 as the quantity of the target second time domain resource units included in the at least one target first time domain resource unit.

With reference to the first aspect or any possible implementation in the foregoing, in another possible implementation of the first aspect, the determining, by the terminal, at least one target second time domain resource unit from the at least one target first time domain resource unit includes determining, by the terminal, the at least one target second time domain resource unit from the at least one target first time domain resource unit according to target second time domain resource unit configuration information indicated on a network side.

With reference to the first aspect or any possible implementation in the foregoing, in another possible implementation of the first aspect, the determining, by the terminal, at least one target second time domain resource unit from the at least one target first time domain resource unit includes determining, by the terminal, the at least one target second time domain resource unit from the at least one target first time domain resource unit according to a preset rule.

With reference to the first aspect or any possible implementation in the foregoing, in another possible implementation of the first aspect, the determining, by the terminal, the at least one target second time domain resource unit from the at least one target first time domain resource unit according to a preset rule includes determining, by the terminal, as the target second time domain resource unit, the first target second time domain resource unit that is in the at least one target first time domain resource unit and includes a resource used to transmit a reference signal.

With reference to the first aspect or any possible implementation in the foregoing, in another possible implementation of the first aspect, the determining, by the terminal, the at least one target second time domain resource unit from the at least one target first time domain resource unit according to a preset rule includes determining, by the terminal, the at least one target second time domain resource unit from the at least one target first time domain resource unit according to a resource identifier ID of the reference signal resource or a group ID of a resource group to which the reference signal resource belongs.

With reference to the first aspect or any possible implementation in the foregoing, in another possible implementation of the first aspect, the determining, by the terminal, at least one target second time domain resource unit from the at least one target first time domain resource unit includes determining an initial target second time domain resource unit from the at least one target first time domain resource unit; and when the initial target second time domain resource unit does include a resource used to transmit a reference signal, determining, from the at least one target first time domain resource unit, the at least one target second time domain resource unit different from the initial target second time domain resource unit.

With reference to the first aspect or any possible implementation in the foregoing, in another possible implementation of the first aspect, the determining, from the at least one target first time domain resource unit, the target second time domain resource unit different from the initial target second time domain resource unit includes determining, as the target second time domain resource unit, a target second time domain resource unit that is closest to the initial target second time domain resource unit and includes a resource used to transmit a reference signal, or determining, as the target second time domain resource unit, a target second time domain resource unit that is closest after the initial target second time domain resource unit and includes a resource used to transmit a reference signal.

With reference to the first aspect or any possible implementation in the foregoing, in another possible implementation of the first aspect, the determining, by the terminal, at least one target second time domain resource unit from the at least one target first time domain resource unit includes, when the target second time domain resource unit determined from the at least one target first time domain resource unit determined in the current period does include a resource used to transmit a reference signal, determining, by the terminal, the target second time domain resource unit from another target first time domain resource unit determined in the period.

With reference to the first aspect or any possible implementation in the foregoing, in another possible implementation of the first aspect, the receiving, by a terminal, time domain resource configuration information of a reference signal resource includes receiving, by the terminal, the time domain resource configuration information sent by a network device by using radio resource control RRC signaling.

With reference to the first aspect or any possible implementation in the foregoing, in another possible implementation of the first aspect, a target first time domain resource unit is used as a unit for values of the period and the time domain resource offset.

With reference to the first aspect or any possible implementation in the foregoing, in another possible implementation of the first aspect, the at least one target first time domain resource unit is a subframe or slot.

With reference to the first aspect or any possible implementation in the foregoing, in another possible implementation of the first aspect, the second time domain resource unit is a slot or a mini slot or an orthogonal frequency division multiplexing OFDM symbol.

With reference to the first aspect or any possible implementation in the foregoing, in another possible implementation of the first aspect, the reference signal is a sounding reference signal or a channel state information reference signal CSI-RS.

A second aspect provides a wireless communications method including determining, by a network device, a period of a reference signal resource and a time domain resource offset of the reference signal resource; sending, by the network device, time domain resource configuration information of the reference signal resource to a terminal; determining, by the network device, at least one target first time domain resource unit according to the period and the time domain resource offset; determining, by the network device, at least one target second time domain resource unit from the at least one target first time domain resource unit, where the at least one target first time domain resource unit includes at least one target second time domain resource unit; and receiving or sending, by the network device, a reference signal on a reference signal resource in the at least one target second time domain resource unit, or performing, by the network device, rate matching or puncturing processing on a signal on a reference signal resource in the at least one target second time domain resource unit.

Therefore, in this embodiment of this application, a network device determines a period of a reference signal resource and a time domain resource offset of the reference signal resource, the network device sends time domain resource configuration information of the reference signal resource to a terminal, the network device determines at least one target first time domain resource unit according to the period and the time domain resource offset, the network device determines at least one target second time domain resource unit from the at least one target first time domain resource unit, where the at least one target first time domain resource unit includes at least one target second time domain resource unit, and the network device receives or sends a reference signal on a reference signal resource in the at least one target second time domain resource unit or the network device performs rate matching or puncturing processing on a signal on a reference signal resource in the at least one target second time domain resource unit, to improve the flexibility in resource configuration of a reference signal.

With reference to the second aspect, in a possible implementation of the second aspect, before the sending, by the network device, time domain resource configuration information of the reference signal resource to a terminal, the method further includes determining, by the network device, the time domain resource configuration information according to the determined period, the determined time domain resource offset, and a first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

With reference to the second aspect or any possible implementation in the foregoing, in another possible implementation of the second aspect, the determining, by the network device, the time domain resource configuration information according to the determined period, the determined time domain resource offset, and a first subcarrier spacing includes determining, by the network device, a used mapping relationship table from at least one mapping relationship table according to the first subcarrier spacing, where the mapping relationship table is used to indicate a correspondence between at least one piece of time domain resource configuration information and at least one period and at least one time domain resource offset; and determining, by the network device, the time domain resource configuration information from the determined mapping relationship table according to the determined period and the time domain resource offset.

With reference to the second aspect or any possible implementation in the foregoing, in another possible implementation of the second aspect, the determining, by the network device, at least one target first time domain resource unit according to the period and the time domain resource offset includes determining, by the network device, the at least one target first time domain resource unit according to the period, the time domain resource offset, and the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

With reference to the second aspect or any possible implementation in the foregoing, in another possible implementation of the second aspect, the determining, by the network device, the at least one target first time domain resource unit according to the period, the time domain resource offset, and the first subcarrier spacing includes determining, by the network device, a quantity N of target first time domain resource units included in a single period according to the period and the first subcarrier spacing; and determining the at least one target first time domain resource unit according to N and the time domain resource offset.

With reference to the second aspect or any possible implementation in the foregoing, in another possible implementation of the second aspect, the determining, by the network device, the at least one target first time domain resource unit according to the period, the time domain resource offset, and the first subcarrier spacing includes determining, by the network device, the time domain resource offset corresponding to the first subcarrier spacing according to the time domain resource offset and the first subcarrier spacing; and determining, by the network device, the at least one target first time domain resource unit according to the time domain resource offset corresponding to the first subcarrier spacing and the period.

With reference to the second aspect or any possible implementation in the foregoing, in another possible implementation of the second aspect, the determining, by the network device, at least one target first time domain resource unit according to the period and the time domain resource offset includes determining, by the network device, an initial target first time domain resource unit according to the period and the time domain resource offset; and when the initial target first time domain resource unit does include a resource used to transmit a reference signal, determining, by the network device, the at least one target first time domain resource unit different from the initial target first time domain resource unit.

With reference to the second aspect or any possible implementation in the foregoing, in another possible implementation of the second aspect, the determining, by the network device, at least one target second time domain resource unit from the at least one target first time domain resource unit includes determining, by the network device, a quantity of target second time domain resource units included in the at least one target first time domain resource unit according to the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource; and determining the at least one target second time domain resource unit according to the quantity.

With reference to the second aspect or any possible implementation in the foregoing, in another possible implementation of the second aspect, the determining, by the network device, at least one target second time domain resource unit from the at least one target first time domain resource unit includes determining an initial target second time domain resource unit from the at least one target first time domain resource unit; and when the initial target second time domain resource unit does include a resource used to transmit a reference signal, determining, from the at least one target first time domain resource unit, the at least one target second time domain resource unit different from the initial target second time domain resource unit.

A third aspect provides a terminal, configured to perform the foregoing method in the first aspect or any possible implementation of the first aspect. Specifically, the terminal includes functional modules configured to perform the foregoing method in the first aspect or any possible implementation of the first aspect.

A fourth aspect provides a network device, configured to perform the foregoing method in the second aspect or any possible implementation of the second aspect. Specifically, the network device includes functional modules configured to perform the foregoing method in the second aspect or any possible implementation of the second aspect.

A fifth aspect provides a terminal, including a processor, a memory, and a transceiver. The processor, the memory, and the transceiver communicate with each other through internal connection channels to transfer control and/or data signals, to enable the terminal to perform the foregoing method in the first aspect or any possible implementation of the first aspect.

A sixth aspect provides a network device, including a processor, a memory, and a transceiver. The processor, the memory, and the transceiver communicate with each other through internal connection channels to transfer control and/or data signals, to enable the network device to perform the foregoing method in the second aspect or any possible implementation of the second aspect.

A seventh aspect provides a computer readable medium, configured to store a computer program, the computer program including an instruction used to perform any method in the foregoing or the method in any possible implementation.

An eighth aspect provides a computer program product including an instruction, where the instruction enables, when being executed on the computer, the computer to perform any method in the foregoing or the method in any possible implementation.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DETAILED DESCRIPTION OF THE INVENTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a 5G system, or the like.

Figure 1:
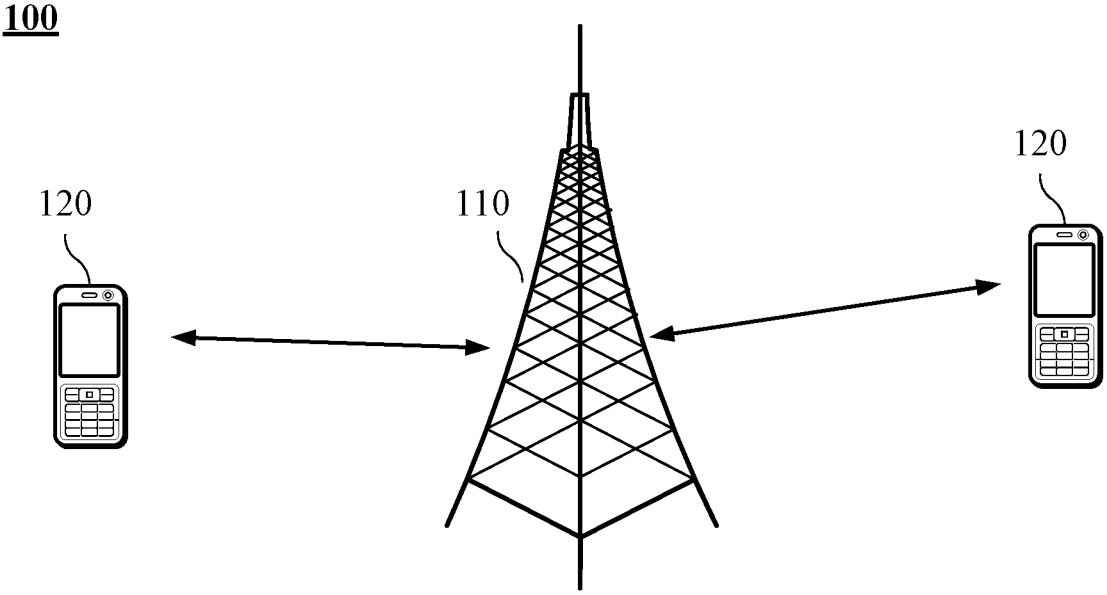
FIG. 1 is a schematic diagram of a wireless communications system according to an embodiment of this application.

FIG. 1 shows a wireless communications system 100 according to an embodiment of this application. As shown in FIG. 1, the wireless communications system 100 may include a network device 110. The network device 110 may be a device communicating with a terminal device. The network device 110 may provide communication coverage for a specific geographic area, and may communicate with a terminal device (for example, UE) located within the area with coverage. Optionally, the network device 110 may be a base transceiver station (Base Transceiver Station, BTS) in a GSM system or a CDMA system, may be a NodeB (NodeB, NB) in a WCDMA system, or may be an evolutional Node B (Evolutional Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a 5G network, a network device in a future evolved public land mobile network (Public Land Mobile Network, PLMN), or the like.

The wireless communications system 100 further includes at least one terminal device 120 located within a coverage range of the network device 110. The terminal device 120 may be mobile or fixed. Optionally, the terminal device 120 may be an access terminal, user equipment (User Equipment, UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a 5G network, a terminal device in a future evolved PLMN, or the like.

Optionally, the terminal device 120 may perform device to device (Device to Device, D2D) communication.

Optionally, a 5G system or network may be further referred to as a new radio (New Radio, NR) system or network.

FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller and a mobility management entity. This is not limited in this embodiment of this application.

It should be understood that terms "system" and "network" in this specification are usually interchangeably used in this specification. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

Figure 2:
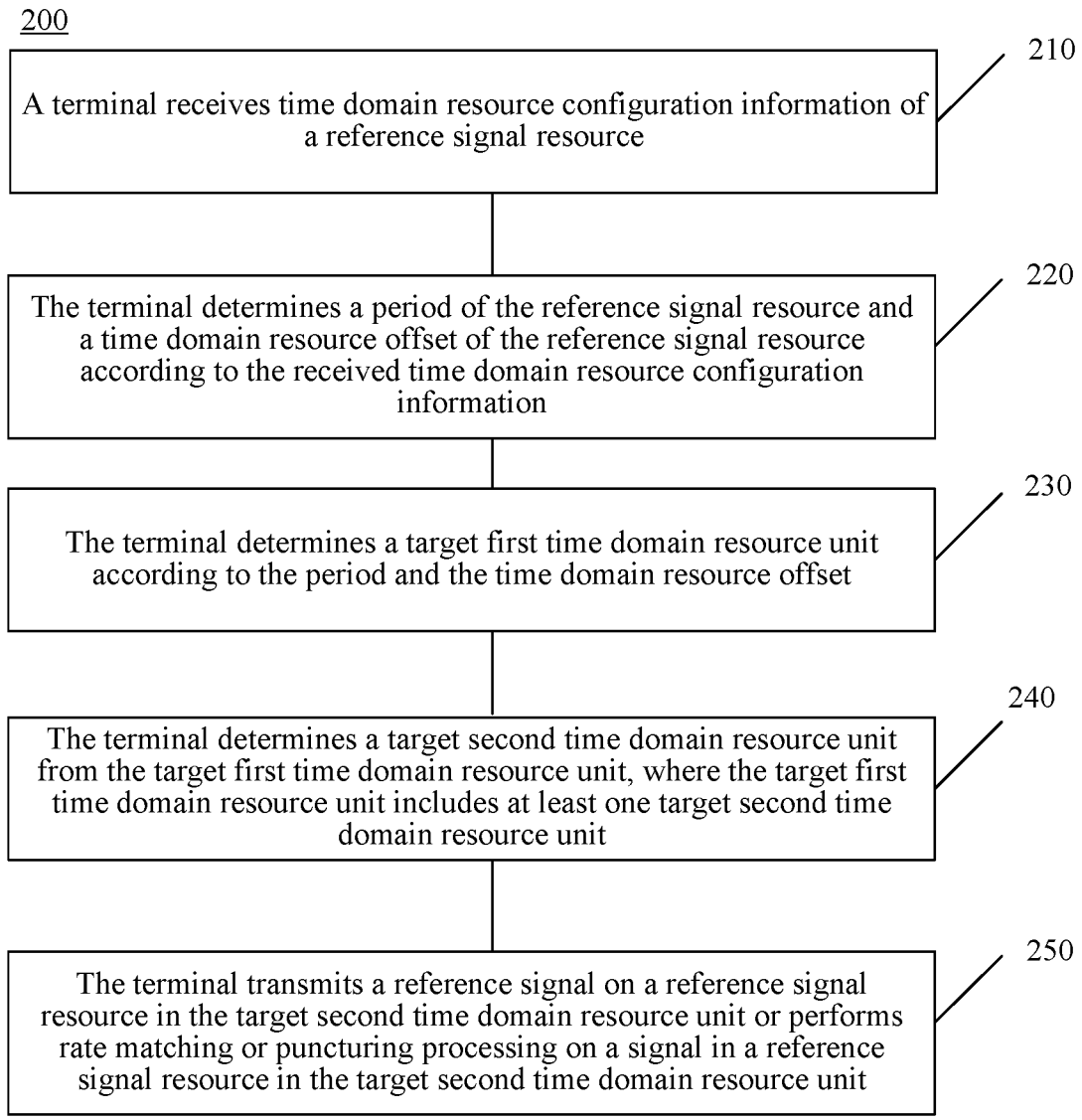
FIG. 2 is a schematic flowchart of a wireless communications method according to an embodiment of this application.

FIG. 2 is a schematic flowchart of a wireless communications method 200 according to an embodiment of this application. The method 200 may be optionally applied to the system shown in FIG. 1, but is not limited thereto. The method 200 includes at least some of the following content.

210. A terminal receives time domain resource configuration information of a reference signal resource.

Optionally, a reference signal mentioned in this embodiment of this application may be an SRS or a CSI-RS.

Optionally, the terminal may receive the time domain resource configuration information sent by a network device. The time domain resource configuration information may be carried in radio resource control (Radio Resource Control, RRC) signaling. Certainly, the time domain resource configuration information may be alternatively carried in other signaling. This is not specifically limited in this embodiment of this application.

Optionally, the reference signal resource mentioned in this embodiment of this application may be a reference signal resource having an independent configuration. Compared with other reference signal resources, each reference signal resource may have an independent configuration parameter, for example, have an independent time domain resource configuration parameter, an independent frequency domain resource configuration parameter, an independent reference signal sending period, an independent reference signal trigger mode, an independent transmit beam, an independent reference signal sending times that exists when sending of a reference signal is triggered or the like.

When each reference signal resource has an independent configuration parameter compared with other reference signal resources, each SRS may have an independent configuration parameter compared with other SRSs or each CSI-RS may have an independent configuration parameter compared with other CSI-RSs.

Optionally, a reference signal resource group may include at least one reference signal resource. Compared with other reference signal resource groups, each reference signal resource group has at least one independent configuration parameter and/or each reference signal resource group has at least one common configuration parameter. The parameter mentioned here may include a time domain resource configuration parameter, a frequency domain resource configuration parameter, a reference signal sending period, a reference signal trigger mode, a transmit beam, reference signal sending times that exists when sending of a reference signal is triggered or the like.

Optionally, the reference signal resource group may have a group ID, and a resource in the group may have a resource ID.

Optionally, the reference signal resource group mentioned in this embodiment of this application may also be referred to as a reference signal resource set.

220. The terminal determines a period of the reference signal resource and a time domain resource offset of the reference signal resource according to the received time domain resource configuration information.

Optionally, a target first time domain resource unit may be used as a unit for the period, and the target first time domain resource unit is optionally a radio frame, a subframe, a slot, a mini slot or the like.

For example, the period may be indicated as N target first time domain resource units, where N=1/K or N=K, and K is a natural number.

Optionally, a target first time domain resource unit may be used as a unit for the time domain resource offset, and the target first time domain resource unit is optionally a radio frame, a subframe, a slot, a mini slot or the like.

Optionally, when a radio frame, a subframe, a slot or a mini slot is used as a unit for the period and the time domain resource offset, a radio frame, a subframe, a slot or a mini slot with a fixed subcarrier spacing may be used as a unit or a radio frame, a subframe, a slot or a mini slot with a current subcarrier spacing may be used as a unit.

Optionally, absolute time may be alternatively used as a unit for the period and the time domain resource offset. For example, ms is used as a unit for a period.

Optionally, the time domain resource configuration information may directly instruct to carry the values of the period and the time domain resource offset. That is, the time domain resource configuration information directly carries the values of the period and the time domain resource offset of the reference signal resource.

Optionally, the terminal determines the period and the time domain resource offset according to the received time domain resource configuration information and a first subcarrier spacing, where the first subcarrier spacing is a subcarrier spacing used to transmit a signal in a bandwidth part (BandWidth Part, BWP) in which the reference signal resource is located, or is a subcarrier spacing used for the reference signal resource, or is a subcarrier spacing used by the terminal to receive or send a reference signal on the reference signal resource.

Optionally, the terminal determines a used mapping relationship table from at least one mapping relationship table according to a subcarrier spacing used to transmit a reference signal on the reference signal resource, where the mapping relationship table is used to indicate a correspondence between at least one piece of time domain resource configuration information and at least one period and at least one time domain resource offset; and the terminal determines the used period and the time domain resource offset from the determined mapping relationship table according to the received time domain resource configuration information.

Optionally, the at least one mapping relationship table may be preset on the terminal or may be configured by the network device for the terminal.

For example, four mapping relationship tables respectively correspond to four different subcarrier spacings of 15 kHz, 30 kHz, 60 kHz, and 120 kHz. The terminal may determine a used table according to the first subcarrier spacing.

The mapping relationship tables that respectively correspond to the four different subcarrier spacings of 15 kHz, 30 kHz, 60 kHz, and 120 kHz may be shown in the following Tables 1 to 4.

TABLE 1

(the subcarrier spacing corresponding to 15 kHz)

| Time domain resource configuration information of a reference signal resource | Period (in the unit of slot) | Time domain resource offset |
|---|---|---|
| 0 | 2 | 0 |
| 1 | 2 | 1 |
| 2 | 4 | 0 |
| ... | ... | ... |
| K | X | X − 1 |
| K + 1 to 1023 | Reserved | Reserved |

TABLE 2

(the subcarrier spacing corresponding to 30 kHz)

| Time domain resource configuration information of a reference signal resource | Period (in the unit of slot) | Time domain resource offset |
|---|---|---|
| 0 | 2 | 0 |
| 1 | 2 | 1 |
| 2 | 4 | 0 |
| ... | ... | ... |
| K1 | 2X | 2X − 1 |
| K1 to 2047 | Reserved | Reserved |

TABLE 3

(the subcarrier spacing corresponding to 60 kHz)

| Reference signal time domain resource configuration information | Period (in the unit of slot) | Time domain resource offset |
|---|---|---|
| 0 | 2 | 0 |
| 1 | 2 | 1 |
| 2 | 4 | 0 |
| ... | ... | ... |
| K2 | 4X | 4X − 1 |
| K2 to 4095 | Reserved | Reserved |

TABLE 4

(the subcarrier spacing corresponding to 120 kHz)

| Reference signal time domain resource configuration information | Period (in the unit of slot) | Time domain resource offset |
|---|---|---|
| 0 | 2 | 0 |
| 1 | 2 | 1 |
| 2 | 4 | 0 |
| ... | ... | ... |
| K3 | 8X | 8X − 1 |
| K3 to 8191 | Reserved | Reserved |

Optionally, mapping relationship tables corresponding to different subcarrier spacings may have a nested structure. For example, a mapping relationship table corresponding to a subcarrier spacing of N*15 kHz includes content in a mapping relationship table corresponding to a subcarrier spacing of M*15 kHz, where N>M.

When mapping tables have a nested structure, it means that tables used for different subcarrier spacings are nested.

For example, 100 rows are used for 120 kHz, the top 80 of the 100 rows are used for 60 kHz, and the top 60 of the 100 rows are used for 30 kHz, and so on.

Optionally, mapping relationship tables corresponding to different subcarrier spacings may have different forms.

For example, the quantity of rows of the mapping relationship table corresponding to the subcarrier spacing of N*15 kHz is N times the quantity of rows of the mapping relationship table corresponding to the subcarrier spacing of 15 kHz.

Optionally, periods included in mapping relationship tables corresponding to different subcarrier spacings may have different maximum values and minimum values.

For example, a maximum value of the period in the mapping relationship table corresponding to the subcarrier spacing of N*15 kHz is N times a maximum value of the period in a mapping relationship table corresponding to a subcarrier spacing of 15 kHz.

For example, a minimum value of the period in the mapping relationship table corresponding to the subcarrier spacing of N*15 kHz is N times a maximum value of the period in the mapping relationship table corresponding to the subcarrier spacing of 15 kHz.

It should be understood that although in the foregoing the period and the time domain resource offset are determined in a manner of determining a mapping relationship table by using a subcarrier spacing, the period and the time domain resource offset may be alternatively obtained in another manner by using a subcarrier spacing. For example, the period and the time domain resource offset are obtained by substituting a subcarrier spacing and the time domain resource configuration information into a formula.

230. The terminal determines at least one target first time domain resource unit according to the period and the time domain resource offset.

Optionally, the at least one target first time domain resource unit is a radio frame, a subframe or a slot.

Optionally, the terminal determines the at least one target first time domain resource unit according to the period, the time domain resource offset, and the first subcarrier spacing, where the first subcarrier spacing is a subcarrier spacing used to transmit a signal in a bandwidth part (Band Width Part, BWP) in which the reference signal resource is located, or is a subcarrier spacing used for the SRS resource, or is a subcarrier spacing used by the terminal to receive or send a reference signal on the reference signal resource.

Optionally, the terminal determines a quantity N of target first time domain resource units included in a single period according to the period and the first subcarrier spacing; and determines the at least one target first time domain resource unit according to N and the time domain resource offset.

Specifically, the first subcarrier spacing may be used to convert the determined period into a quantity N of target first time domain resource units included in a single period with the first subcarrier spacing.

For example, when the period is P millisecond sand the subcarrier spacing is N kHz, the quantity of target first time domain resource units included in one period is P*N/15.

For example, when the determined period is M time units at 30 kHz and the first subcarrier spacing is 15 kHz, M time units at 30 kHz are M/2 time units at 15 kHz.

Optionally, the terminal determines the time domain resource offset corresponding to the subcarrier spacing according to the time domain resource offset and the subcarrier spacing; and the terminal determines the at least one target first time domain resource unit according to the time domain resource offset corresponding to the subcarrier spacing and the period.

For example, it is assumed that the time domain resource offset is L milliseconds and the subcarrier spacing is N kHz, and an index of the at least one target first time domain resource unit may be indicated as L*N/15.

For example, when the quantity of time units in the time domain resource offset at 30 kHz is M and the first subcarrier spacing is 15 kHz, the M time units at 30 kHz are M/2 time units at 15 kHz.

Optionally, the terminal determines the at least one target first time domain resource unit by using a target first time domain resource unit represented by the time domain resource offset as the first target first time domain resource unit in which the reference signal resource is located and by using the period.

For example, the at least one target first time domain resource unit is a subframe, the time domain resource offset is N subframes, the period is M subframes, and the terminal determines, by using N subframe offsets starting from a current subframe as starting points and M subframes as periods, periodic subframes as target subframes of the reference signal resource.

Optionally, the terminal determines an initial target first time domain resource unit according to the period and the time domain resource offset; and when the initial target first time domain resource unit does include a resource used to transmit a reference signal, and the terminal determines the at least one target first time domain resource unit different from the initial target first time domain resource unit.

In an implementation, the at least one target first time domain resource unit is determined from another period different from a current period.

Specifically, when the at least one target first time domain resource unit determined in the current period does include a resource used to transmit a reference signal, the at least one target first time domain resource unit may continue to be determined in another period.

In an implementation, a target first time domain resource unit that is closest to the initial target first time domain resource unit and includes a resource used to transmit a reference signal is determined as the target first time domain resource unit.

Specifically, if the currently determined target first time domain resource unit does include a resource used to transmit a reference signal, a closest target first time domain resource unit that includes a resource used to transmit a reference signal may be determined as the target first time domain resource unit, where the closest target first time domain resource unit that includes a resource used to transmit a reference signal may be a time domain resource unit that is before the target first time domain resource unit or after the target first time domain resource unit and in which signal transmission is not performed. The re determined target first time domain resource unit and the determined target first time domain resource unit that does include a resource used to transmit a reference signal may belong to the same period or may belong to different periods.

In an implementation, a target first time domain resource unit that is closest after the initial target first time domain resource unit and includes a resource used to transmit a reference signal is determined as the target first time domain resource unit.

Specifically, if the currently determined target first time domain resource unit does include a resource used to transmit a reference signal, a target first time domain resource unit that is closest after the currently determined target first time domain resource unit and includes a resource used to transmit a reference signal may be determined as the target first time domain resource unit. The re determined target first time domain resource unit and the determined target first time domain resource unit that does include a resource used to transmit a reference signal may belong to the same period or may belong to different periods.

For example, when the reference signal is an SRS and the target first time domain resource unit is a slot, if the slot determined by the terminal according to the period and the time domain resource offset is a downlink slot and does include a resource used to an uplink signal, the terminal may conclude that no SRS resource exists in the period or the SRS resource is located in a closest uplink slot after the downlink slot.

It should be understood that the "initial" in "the initial target first time domain resource unit" mentioned in this embodiment of this application is merely used to clearly describe that when the determined target first time domain resource unit does include a resource used to transmit a reference signal, the target first time domain resource unit further needs to be determined. If the determined target first time domain resource unit includes a resource used to transmit a reference signal, the concept of "initial" does not apply. That is, the concept of "initial" should not constitute a special limitation to this embodiment of this application.

240. The terminal determines a at least one target second time domain resource unit from the at least one target first time domain resource unit, where the at least one target first time domain resource unit includes at least one target second time domain resource unit.

Optionally, the target second time domain resource unit may be a slot, a mini slot or an orthogonal frequency division multiplexing (Orthogonal Frequency Division Multiplexing, OFDM) symbol.

Optionally, when the target first time domain resource unit is a subframe, the target second time domain resource unit may be a slot, a mini slot or a subframe.

Optionally, when the target first time domain resource unit is a slot or a mini slot, the target second time domain resource unit may be an OFDM symbol.

Optionally, the terminal determines a quantity of target second time domain resource units included in the at least one target first time domain resource unit according to a subcarrier spacing used to transmit a reference signal on the reference signal resource; and determines the target second time domain resource unit according to the quantity.

Optionally, when a subcarrier spacing used to transmit a reference signal on the reference signal resource is N kHz, a value obtained by dividing N by 15 is determined as the quantity of the target second time domain resource units included in the at least one target first time domain resource unit.

Optionally, the terminal determines the at least one target second time domain resource unit from the at least one target first time domain resource unit according to target second time domain resource unit configuration information indicated on a network side.

Specifically, the network side may configure an index of the target second time domain resource unit used by the terminal to transmit a reference signal in the at least one target first time domain resource unit.

Optionally, the terminal determines the at least one target second time domain resource unit from the at least one target first time domain resource unit according to a preset rule.

In an implementation, the terminal determines, as the at least one target second time domain resource unit, the at least one first target second time domain resource unit that is in the at least one target first time domain resource unit and includes a resource used to transmit a reference signal.

In an implementation, the terminal determines the at least one target second time domain resource unit from the at least one target first time domain resource unit according to a resource identifier (Identifier, ID) of the reference signal resource or a group ID of a resource group to which the reference signal resource belongs.

For example, if the resource ID or the group ID is N and a quantity of target second time domain resource units included in the at least one target first time domain resource unit is K, the index of the at least one target second time domain resource unit may be indicated as L=N mod K.

Optionally, the terminal may determine, according to the quantity and in combination with other configuration information of the network side, the target second time domain resource unit in which the reference signal resource is located. For example, the target second time domain resource unit is determined according to the quantity and in combination with index information of a target second time domain resource unit additionally configured by the network side by using higher layer signaling.

Alternatively, the terminal may determine the at least one target second time domain resource unit from the at least one target first time domain resource unit according to the quantity and the preset rule.

Optionally, an initial target second time domain resource unit is determined from the target first time domain resource unit; and when the initial target second time domain resource unit does include a resource used to transmit a reference signal, the target second time domain resource unit different from the initial target second time domain resource unit is determined from the at least one target first time domain resource unit.

In an implementation, a target second time domain resource unit that is closest to the initial target second time domain resource unit and includes a resource used to transmit a reference signal is determined as the target second time domain resource unit.

Specifically, if the currently determined target second time domain resource unit does include a resource used to transmit a reference signal, a closest target second time domain resource unit that includes a resource used to transmit a reference signal may be determined as the target second time domain resource unit, where the closest target second time domain resource unit that includes a resource used to transmit a reference signal may be a target second time domain resource unit that is before the target second time domain resource unit or after the target second time domain resource unit and in which signal transmission is not performed. The redetermined target second time domain resource unit and the determined target second time domain resource unit that does include a resource used to transmit a reference signal may belong to the same target first time domain resource unit.

In an implementation, a target second time domain resource unit that is closest after the initial target second time domain resource unit and includes a resource used to transmit a reference signal is determined as the target second time domain resource unit.

Specifically, if the currently determined target second time domain resource unit does include a resource used to transmit a reference signal, a target second time domain resource unit that is closest after the currently determined target second time domain resource unit and includes a resource used to transmit a reference signal may be determined as the target second time domain resource unit. The redetermined target second time domain resource unit and the determined target second time domain resource unit that does include a resource used to transmit a reference signal may belong to the same target first time domain resource unit.

Optionally, when the at least one target second time domain resource unit determined from the at least one target first time domain resource unit determined in the current period does include a resource used to transmit a reference signal, the terminal determines the at least one target second time domain resource unit from another target first time domain resource unit determined in the period.

Specifically, if the target second time domain resource unit determined in the current period does include a resource used to transmit a reference signal, the at least one target first time domain resource unit may continue to be determined in another period, and the at least one target second time domain resource unit is further determined. That is, a reference signal is no longer received or sent in the current period, regardless of whether another target second time domain resource unit included in the at least one target first time domain resource unit includes a resource used to transmit a reference signal.

250. The terminal transmits a reference signal on a reference signal resource in the at least one target second time domain resource unit or the terminal performs rate matching or puncturing processing on a signal on a reference signal resource in the at least one target second time domain resource unit.

Optionally, when the reference signal is an SRS, the rate matching or puncturing processing on a signal may be rate matching or puncturing processing on an uplink signal.

When the uplink signal is a non-SRS uplink signal (for example, a physical uplink shared channel (Physical Uplink Shared Channel, PUSCH)), rate matching may be performed.

Alternatively, when the uplink signal is an SRS, puncturing processing may be performed.

Optionally, when the reference signal is a CSI-RS, rate matching or puncturing processing is performed on a signal, and rate matching or puncturing processing may be performed on a downlink signal.

When the downlink signal is a non-CSI-RS downlink signal (for example, a physical downlink shared channel (Physical Downlink Shared Channel, PDSCH)), rate matching may be performed.

Alternatively, when the downlink signal is a CSI-RS, puncturing processing may be performed.

Optionally, the aforementioned first subcarrier spacing is a subcarrier spacing used to transmit a signal in a bandwidth part in which the reference signal resource is located, or is a subcarrier spacing used by the terminal to receive or send a reference signal on the reference signal resource, and the terminal transmits a reference signal on a reference signal resource in the at least one target second time domain resource unit.

Optionally, when the aforementioned first subcarrier spacing is a subcarrier spacing used for the reference signal resource, rate matching or puncturing processing is performed on a signal on a reference signal resource in the at least one target second time domain resource unit.

Optionally, a subcarrier spacing configured for the reference signal resource mentioned in this embodiment of this application may be used by another terminal to send a reference signal.

Optionally, another resource (for example, a frequency domain resource or a sequence) other than a time domain resource of the reference signal resource may be determined by using signaling (frequency domain resource configuration information or sequence configuration information) sent by the network device to the terminal.

Therefore, in this embodiment of this application, a terminal determines a period of a reference signal resource and a time domain resource offset of the reference signal resource according to received time domain resource configuration information, the terminal determines at least one target first time domain resource unit according to the period and the time domain resource offset, the terminal determines at least one target second time domain resource unit from the at least one target first time domain resource unit, and the terminal sends or receives a reference signal on a reference signal resource in the at least one target second time domain resource unit or performs puncturing processing or rate matching on a reference signal resource in the at least one target second time domain resource unit. Therefore, the flexibility in resource configuration of a reference signal is improved, and transmission of a reference signal may match more flexible communication scenarios, for example, a multi-subcarrier communication scenario.

Figure 3:
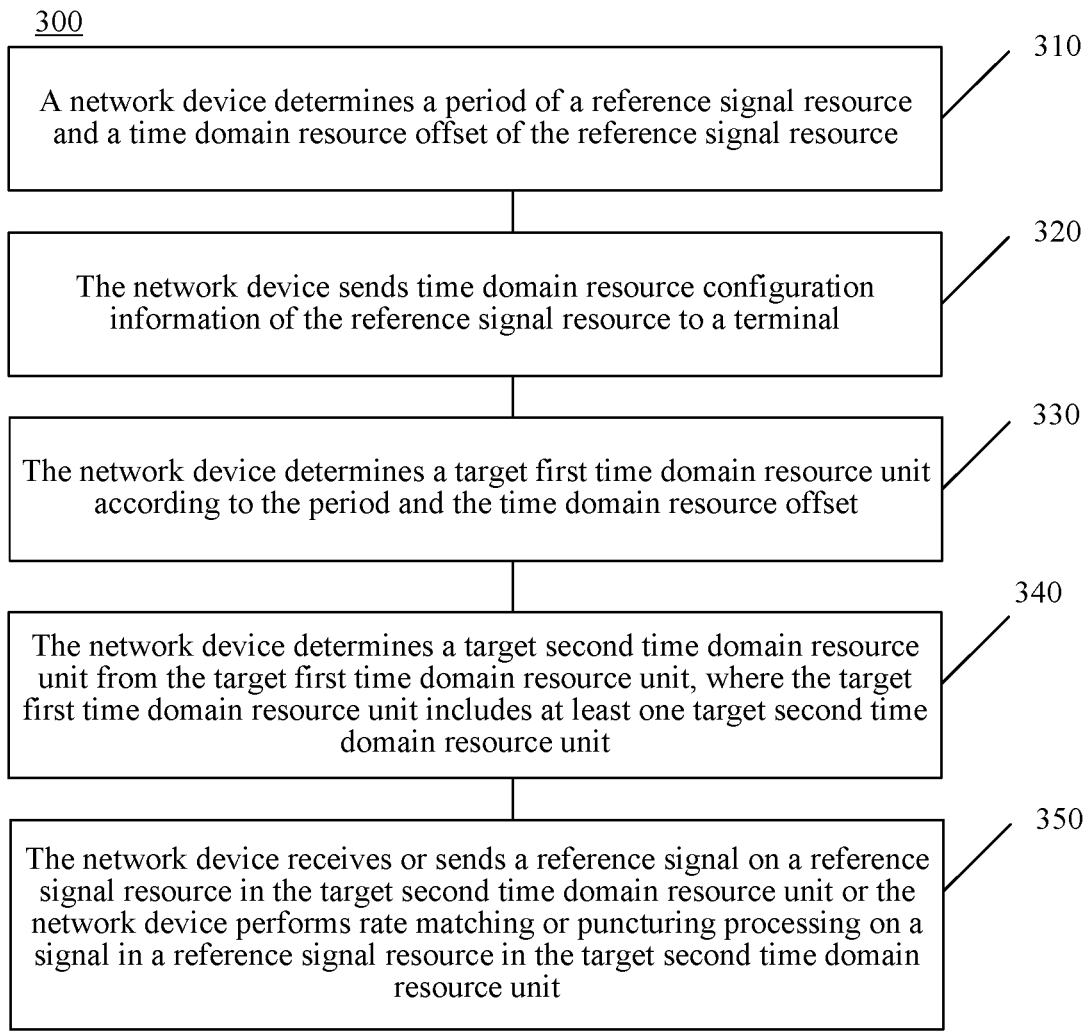
FIG. 3 is a schematic flowchart of a wireless communications method according to an embodiment of this application.

FIG. 3 is a schematic flowchart of a wireless communications method 300 according to an embodiment of this application. The method 300 includes at least some of the following content.

310. A network device determines a period of a reference signal resource and a time domain resource offset of the reference signal resource.

320. The network device sends time domain resource configuration information of the reference signal resource to a terminal.

330. The network device determines at least one target first time domain resource unit according to the period and the time domain resource offset.

340. The network device determines at least one target second time domain resource unit from the at least one target first time domain resource unit, where the at least one target first time domain resource unit includes at least one target second time domain resource unit.

350. The network device receives or sends a reference signal on a reference signal resource in the at least one target second time domain resource unit or the network device performs rate matching or puncturing processing on a signal on a reference signal resource in the at least one target second time domain resource unit.

Optionally, the network device determines the time domain resource configuration information according to the determined period, the determined time domain resource offset, and a first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

Optionally, the network device determines a used mapping relationship table from at least one mapping relationship table according to the first subcarrier spacing, where the mapping relationship table is used to indicate a correspondence between at least one piece of time domain resource configuration information and at least one period and at least one time domain resource offset; and the network device determines the time domain resource configuration information from the determined mapping relationship table according to the determined period and the time domain resource offset.

Optionally, the network device determines the at least one target first time domain resource unit according to the period, the time domain resource offset, and the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource.

Optionally, the network device determines a quantity N of target first time domain resource units included in a single period according to the period and the first subcarrier spacing; and determines the at least one target first time domain resource unit according to N and the time domain resource offset.

Optionally, the network device determines the time domain resource offset corresponding to the first subcarrier spacing according to the time domain resource offset and the first subcarrier spacing; and the network device determines the target first time domain resource unit according to the time domain resource offset corresponding to the first subcarrier spacing and the period.

Optionally, the network device determines the at least one target first time domain resource unit by using a target first time domain resource unit represented by the time domain resource offset as the first target first time domain resource unit in which the reference signal resource is located and by using the period.

Optionally, the network device determines an initial target first time domain resource unit according to the period and the time domain resource offset; and when the initial target first time domain resource unit does include a resource used to transmit a reference signal, the network device determines the at least one target first time domain resource unit different from the initial target first time domain resource unit.

Optionally, the at least one target first time domain resource unit is determined from another period different from a current period, or a target first time domain resource unit that is closest to the initial target first time domain resource unit and includes a resource used to transmit a reference signal is determined as the target first time domain resource unit, or a target first time domain resource unit that is closest after the initial target first time domain resource unit and includes a resource used to transmit a reference signal is determined as the target first time domain resource unit.

Optionally, the network device determines a quantity of target second time domain resource units included in the at least one target first time domain resource unit according to the first subcarrier spacing, where the first subcarrier spacing is a subcarrier spacing used to transmit a signal in a bandwidth part in which the reference signal resource is located, or is a subcarrier spacing used for the reference signal resource, or is a subcarrier spacing used by the terminal to receive or send a reference signal on the reference signal resource, and determines the target second time domain resource unit according to the quantity.

Optionally, when the first subcarrier spacing is N kHz, a value obtained by dividing N by 15 is determined as the quantity of the target second time domain resource units included in the at least one target first time domain resource unit.

Optionally, the network device determines the at least one target second time domain resource unit from the at least one target first time domain resource unit according to target second time domain resource unit configuration information indicated on a network side.

Optionally, the network device determines the at least one target second time domain resource unit from the at least one target first time domain resource unit according to a preset rule.

Optionally, the network device determines, as the at least one target second time domain resource unit, the first target second time domain resource unit that is in the at least one target first time domain resource unit and includes a resource used to transmit a reference signal.

Optionally, the network device determines the at least one target second time domain resource unit from the at least one target first time domain resource unit according to a resource ID of the reference signal resource or a group ID of a resource group to which the reference signal resource belongs.

Optionally, an initial target second time domain resource unit is determined from the at least one target first time domain resource unit; and when the initial target second time domain resource unit does include a resource used to transmit a reference signal, the at least one target second time domain resource unit different from the initial target second time domain resource unit is determined from the at least one target first time domain resource unit.

Optionally, a target second time domain resource unit that is closest to the initial target second time domain resource unit and includes a resource used to transmit a reference signal is determined as the target second time domain resource unit, or a target second time domain resource unit that is closest after the initial target second time domain resource unit and includes a resource used to transmit a reference signal is determined as the target second time domain resource unit.

Optionally, when the at least one target second time domain resource unit determined from the at least one target first time domain resource unit determined in the current period does include a resource used to transmit a reference signal, the network device determines the at least one target second time domain resource unit from another target first time domain resource unit determined in the period.

Optionally, the terminal device receives the time domain resource configuration information sent by the network device by using radio resource control RRC signaling.

Optionally, a target first time domain resource unit is used as a unit for values of the period and the time domain resource offset.

Optionally, the target first time domain resource unit is a subframe or slot.

Optionally, the second time domain resource unit is a slot or a mini slot or an orthogonal frequency division multiplexing OFDM symbol.

Optionally, the reference signal is a sounding reference signal or a channel state information reference signal CSI-RS.

It should be understood that for the method 300, refer to the description of the method 200. For example, for the explanations of terms and the manner in which the network device determines at least one target first time domain resource unit and the at least one target second time domain resource unit, refer to the manner in which the terminal determines the at least one target first time domain resource unit and the at least one target second time domain resource unit. For brevity, details are not described herein again.

Therefore, in this embodiment of this application, a network device determines a period of a reference signal resource and a time domain resource offset of the reference signal resource, the network device sends time domain resource configuration information of the reference signal resource to a terminal, the network device determines at least one target first time domain resource unit according to the period and the time domain resource offset, the network device determines at least one target second time domain resource unit from the at least one target first time domain resource unit, where the at least one target first time domain resource unit includes at least one target second time domain resource unit, and the network device receives or sends a reference signal on a reference signal resource in the at least one target second time domain resource unit or the network device performs rate matching or puncturing processing on a signal on a reference signal resource in the at least one target second time domain resource unit, so that to improve the flexibility in resource configuration of a reference signal, and transmission of a reference signal may match more flexible communication scenarios.

Figure 4:
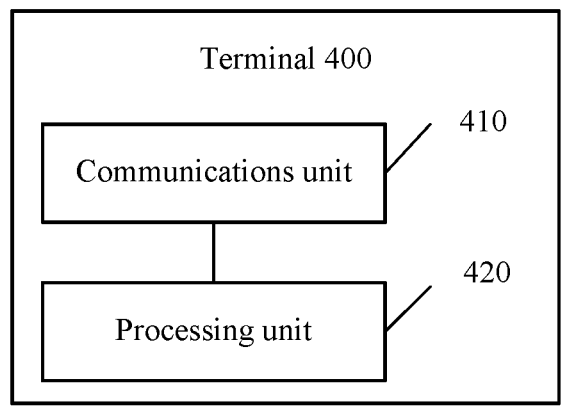
FIG. 4 is a schematic block diagram of a terminal according to an embodiment of this application.

FIG. 4 is a schematic block diagram of a terminal 400 according to an embodiment of this application. As shown in FIG. 4, the terminal 400 includes a communications unit 410 and a processing unit 420.

The communications unit 410 is configured to receive time domain resource configuration information of a reference signal resource. The processing unit 420 is configured to: determine a period of the reference signal resource and a time domain resource offset of the reference signal resource according to the received time domain resource configuration information; determine at least one target first time domain resource unit according to the period and the time domain resource offset; and determine at least one target second time domain resource unit from the at least one target first time domain resource unit, where the at least one target first time domain resource unit includes at least one target second time domain resource unit. The communications unit 410 is further configured to send or receive, by the terminal, a reference signal on a reference signal resource in the at least one target second time domain resource unit or the processing unit 420 is further configured to perform puncturing processing or rate matching on a reference signal resource in the at least one target second time domain resource unit.

It should be understood that the terminal 400 may correspond to the terminal in the method 200, thereby implementing corresponding functions implemented by the terminal in the method 200. For brevity, details are not described herein again.

Figure 5:
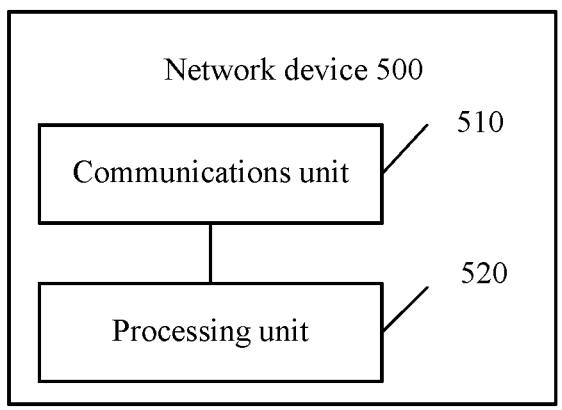
FIG. 5 is a schematic block diagram of a network device according to an embodiment of this application.

FIG. 5 is a schematic block diagram of a network device 500 according to an embodiment of this application. As shown in FIG. 5, the network device 500 includes a communications unit 510 and a processing unit 520.

The processing unit 520 is configured to determine a period of a reference signal resource and a time domain resource offset of the reference signal resource. The communications unit 510 is configured to send time domain resource configuration information of the reference signal resource to a terminal. The processing unit 520 is further configured to: determine at least one target first time domain resource unit according to the period and the time domain resource offset; and determine at least one target second time domain resource unit from the at least one target first time domain resource unit, where the at least one target first time domain resource unit includes at least one target second time domain resource unit. The communications unit 510 is further configured to receive or send reference signal on a reference signal resource in the at least one target second time domain resource unit or the processing unit 520 is further configured to perform rate matching or puncturing processing on a signal on a reference signal resource in the at least one target second time domain resource unit.

It should be understood that the network device 500 may correspond to the network device in the method 300, thereby implementing corresponding functions implemented by the network device in the method 300. For brevity, details are not described herein again.

Figure 6:
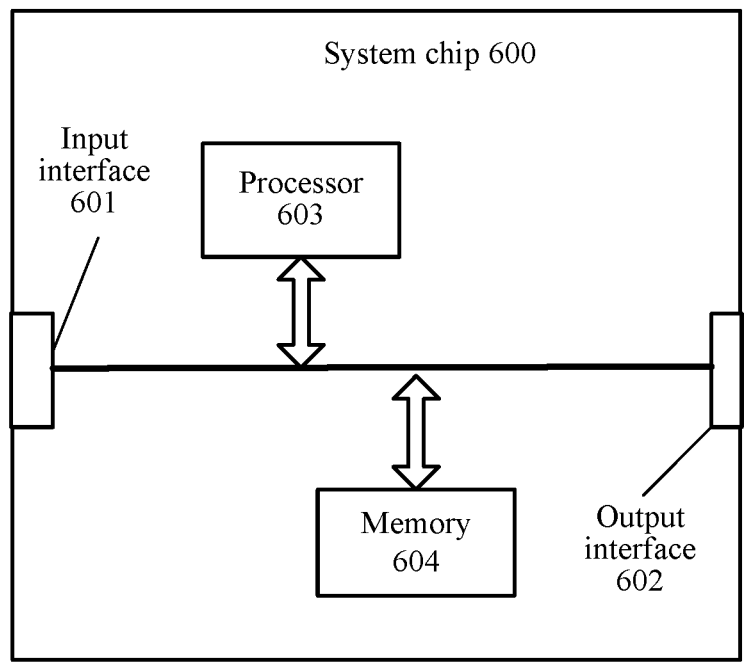
FIG. 6 is a schematic block diagram of a system chip according to an embodiment of this application.

FIG. 6 is a schematic structural diagram of a system chip 600 according to an embodiment of this application. The system chip 600 in FIG. 6 includes an input interface 601, an output interface 602, a processor 603, and a memory 604 that may be connected through an internal communication connection line, where the processor 603 is configured to execute code in the memory 604.

Optionally, when the code is executed, the processor 603 implements the method performed by the network device in the method embodiments. For brevity, details are not described herein again.

Optionally, when the code is executed, the processor 603 implements the method performed by the terminal in the method embodiments. For brevity, details are not described herein again.

Figure 7:
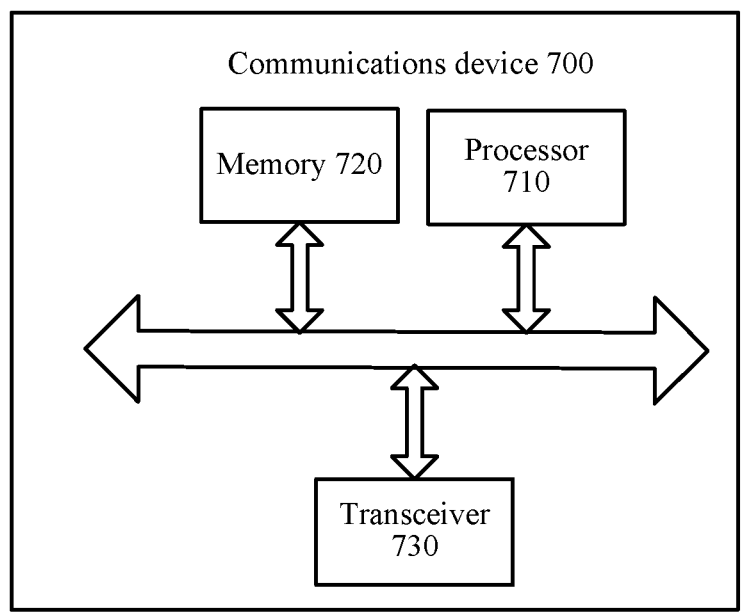
FIG. 7 is a schematic block diagram of a communications device according to an embodiment of this application.

FIG. 7 is a schematic block diagram of a communications device 700 according to an embodiment of this application. As shown in FIG. 7, the communications device 700 includes a processor 710 and a memory 720. The memory 720 may store program code, and the processor 710 may execute the program code stored in the memory 720.

Optionally, as shown in FIG. 7, the communications device 700 may include a transceiver 730, and the processor 710 may control the transceiver 730 to communicate externally.

Optionally, the processor 710 may invoke the program code stored in the memory 720 to perform the corresponding operations of the network device in the method embodiments. For brevity, details are not described herein again.

Optionally, the processor 710 may invoke the program code stored in the memory 720 to perform the corresponding operations of the terminal in the method embodiments. For brevity, details are not described herein again.

It should be understood that the processor in the embodiments of this application may be an integrated circuit chip and has a signal processing capability. During implementation, the steps in the foregoing method embodiments may be implemented by using an integrated logic circuit of hardware in the processor or an instruction in the form of software. The processor may be a general-purpose processor a digital signal processor (Digital Signal Processor DSP), an application specific integrated circuit (Application Specific Integrated Circuit, ASIC), a field programmable gate array (Field Programmable Gate Array, FPGA) or another programmable logic device, a discrete gate or transistor logic device, and a discrete hardware component. The methods, steps, and logic block diagrams disclosed in the embodiments of this application may be implemented or performed. The general-purpose processor may be a microprocessor or the processor may be alternatively any conventional processor or the like. The steps in the methods disclosed with reference to the embodiments of this application may be directly performed or completed by a decoding processor embodied as hardware or performed or completed by using a combination of hardware and software modules in a decoding processor. The software module may be located at a random-access memory, a flash memory, a read-only memory, a programmable read-only memory or an electrically erasable programmable memory, a register or another mature storage medium in this field. The storage medium is located at a memory, and the processor reads information in the memory and completes the steps in the foregoing methods in combination with the hardware thereof.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random-access memory (Random-access memory, RAM) and is used as an external cache. For exemplary rather than limitative description, many forms of RAMs can be used, and are, for example, a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Ram bus random-access memory (Direct Ram bus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of this application. The foregoing storage medium includes: any medium that can store program codes, such as a USB flash disk, a removable hard disk, a read-only memory (ROM, Read-Only Memory), a random-access memory (RAM, Random-access memory), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A wireless communications method comprising:
receiving, by a terminal, time domain resource configuration information of a reference signal resource;
determining, by the terminal, a period of the reference signal resource and a time domain resource offset of the reference signal resource according to the received time domain resource configuration information;
determining, by the terminal, at least one target first time domain resource unit according to the period and the time domain resource offset, wherein the first time domain resource unit is a slot;
determining, by the terminal, at least one target second time domain resource unit from the at least one target first time domain resource unit, wherein a first time domain resource unit is used as a time unit for the at least one target first time domain resource unit, a second time domain resource unit is used as a time unit for the at least one target second time domain resource unit, and each of the first time domain resource unit comprises at least one second time domain resource unit, and wherein the second time domain resource unit is a slot or a mini slot or an orthogonal frequency division multiplexing OFDM symbol; and
receiving, by the terminal, a reference signal on a reference signal resource in the at least one target second time domain resource unit or performing, by the ter- minal, rate matching on a reference signal resource in the at least one target second time domain resource unit.

2. The method of claim 1 wherein determining, by the terminal, a period of the reference signal resource and a time domain resource offset of the reference signal resource according to the received time domain resource configuration information comprises:
determining, by the terminal, the period and the time domain resource offset according to the received time domain resource configuration information and a first subcarrier spacing, wherein the first subcarrier spacing is a subcarrier spacing configured to transmit a signal in a bandwidth part in which the reference signal resource is located, or is a subcarrier spacing used for the reference signal resource, or is a subcarrier spacing used by the terminal to receive or send a reference signal on the reference signal resource.

3. The method of claim 1 wherein determining, by the terminal, a target first time domain resource unit according to the period and the time domain resource offset comprises:
determining, by the terminal, a first target first time domain resource unit of the at least one target first time domain resource unit according to the time domain resource offset; and
determining, by the terminal, a second target first time domain resource unit of the at least one target first time domain resource unit according to the period and the first target first time domain resource unit.

4. The method of claim 1 wherein the determining, by the terminal, at least one target second time domain resource unit from the at least one target first time domain resource unit comprises:
determining, by the terminal, the at least one target second time domain resource unit from the at least one target first time domain resource unit according to a second time domain resource unit configuration information indicated on a network side.

5. The method of claim 1 wherein the receiving, by a terminal, time domain resource configuration information of a reference signal resource comprises:
receiving, by the terminal, the time domain resource configuration information sent by a network device by using radio resource control RRC signaling.

6. The method of claim 1 wherein the at least one first time domain resource unit is used as a time unit for values of the period and the time domain resource offset.

7. The method of claim 1 wherein the reference signal is a sounding reference signal or a channel state information reference signal CSI-RS.

8. A terminal comprising a communications unit and a processing unit, wherein:
the communications unit is configured to receive time domain resource configuration information of a reference signal resource;
the processing unit is configured to:
determine a period of the reference signal resource and a time domain resource offset of the reference signal resource according to the received time domain resource configuration information;
determine at least one target first time domain resource unit according to the period and the time domain resource offset, wherein the first time domain resource unit is a slot; and
determine at least one target second time domain resource unit from the at least one target first time domain resource unit, wherein a first time domain resource unit is used as a time unit for the at least one target first time domain resource unit, a second time domain resource unit is used as a time unit for the at least one target second time domain resource unit, and each of the first time domain resource unit comprises at least one second time domain resource unit, and wherein the second time domain resource unit is a slot or a mini slot or an orthogonal frequency division multiplexing OFDM symbol; and
the communications unit is further configured to send or receive a reference signal on a reference signal resource in the at least one target second time domain resource unit or the processing unit is further configured to perform puncturing processing or rate matching on a reference signal resource in the at least one target second time domain resource unit.

9. The terminal of claim 8 wherein the processing unit is further configured to:
determine the period and the time domain resource offset according to the received time domain resource configuration information and a first subcarrier spacing, wherein the first subcarrier spacing is a subcarrier spacing configured to transmit a signal in a bandwidth part in which the reference signal resource is located, or is a subcarrier spacing used for the reference signal resource, or is a subcarrier spacing used by the terminal to receive or send a reference signal on the reference signal resource.

10. The terminal of claim 8 wherein the processing unit is further configured to:
determine a first target first time domain resource unit of the at least one target first time domain resource unit according to the time domain resource offset; and
determine a second target first time domain resource unit of the at least one target first time domain resource unit according to the period and the first target first time domain resource unit.

11. The terminal of claim 8 wherein the processing unit is further configured to:
determine the at least one target second time domain resource unit from the at least one target first time domain resource unit according to a second time domain resource unit configuration information indicated on a network side.

12. The terminal of claim 8 wherein the processing unit is further configured to receive the time domain resource configuration information sent by a network device by using radio resource control RRC signaling.

13. The terminal of claim 8 wherein the at least one first time domain resource unit is used as a time unit for values of the period and the time domain resource offset.

14. The terminal of claim 8 wherein the reference signal is a sounding reference signal or a channel state information reference signal CSI-RS.

* * * * *